(12) United States Patent
Xing et al.

(10) Patent No.: US 10,906,402 B2
(45) Date of Patent: *Feb. 2, 2021

(54) TOP COVER ASSEMBLY FOR POWER BATTERY AND POWER BATTERY HAVING THE SAME

(71) Applicant: CONTEMPORARY AMPEREX TECHNOLOGY CO., LIMITED, Ningde (CN)

(72) Inventors: Chengyou Xing, Ningde (CN); Jian Guo, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 151 days.

This patent is subject to a terminal disclaimer.

(21) Appl. No.: 16/360,288

(22) Filed: Mar. 21, 2019

(65) Prior Publication Data

US 2019/0221789 A1    Jul. 18, 2019

Related U.S. Application Data

(63) Continuation of application No. 15/657,625, filed on Jul. 24, 2017, now Pat. No. 10,283,742.

(30) Foreign Application Priority Data

Dec. 2, 2016   (CN) .......................... 2016 1 1095369

(51) Int. Cl.
| | |
|---|---|
| *B60L 3/00* | (2019.01) |
| *B60L 50/64* | (2019.01) |
| *H01M 2/04* | (2006.01) |
| *H01M 2/26* | (2006.01) |
| *H01M 2/30* | (2006.01) |
| *H01M 2/34* | (2006.01) |
| *H01M 10/0525* | (2010.01) |

(52) U.S. Cl.
CPC ............. *B60L 3/0046* (2013.01); *B60L 50/64* (2019.02); *H01M 2/043* (2013.01); (Continued)

(58) Field of Classification Search
CPC .................................................. H01M 2/0473
See application file for complete search history.

(56) References Cited

U.S. PATENT DOCUMENTS

| | | |
|---|---|---|
| 2011/0183198 A1 | 7/2011 | Byun et al. |
| 2013/0029190 A1 | 1/2013 | Kim |

(Continued)

FOREIGN PATENT DOCUMENTS

| | | |
|---|---|---|
| EP | 2490282 A1 | 8/2012 |
| JP | 2012174683 A | 9/2012 |

(Continued)

OTHER PUBLICATIONS

Decision to Grant a Patent and search report dated Nov. 27, 2018 for Japanese application No. 2017-224689, 21 pages.

(Continued)

*Primary Examiner* — Brian R Ohara
(74) *Attorney, Agent, or Firm* — Tucker Ellis LLP

(57) ABSTRACT

Provided is a top cover structure for power battery, including a first electrode assembly, a second electrode assembly, a top cover plate electrically connected with the first electrode assembly, and a deformable plate attached to the top cover plate; the second electrode assembly includes a second electrode terminal, a second connecting block, a second insulating piece in which a via-hole and an gas-guide hole are defined, an upper sealing piece arranged between the second insulating piece and the second connecting block and including a sealing area for deforming space and a sealing area for electrode terminal, and a lower sealing piece arranged between the second insulating piece and the top cover plate and enclosing the via-hole for deformable plate. The sealing area for deforming space encloses the via-hole and the gas-guide hole, the sealing area for electrode terminal enclose the second electrode terminal.

20 Claims, 4 Drawing Sheets

(52) U.S. Cl.
CPC ....... *H01M 2/0413* (2013.01); *H01M 2/0417* (2013.01); *H01M 2/0443* (2013.01); *H01M 2/0456* (2013.01); *H01M 2/0473* (2013.01); *H01M 2/0482* (2013.01); *H01M 2/26* (2013.01); *H01M 2/30* (2013.01); *H01M 2/345* (2013.01); *H01M 10/0525* (2013.01); *H01M 2200/20* (2013.01); *H01M 2220/20* (2013.01); *Y02E 60/10* (2013.01); *Y02T 10/70* (2013.01); *Y02T 90/16* (2013.01)

(56) References Cited

U.S. PATENT DOCUMENTS

| | | | | |
|---|---|---|---|---|
| 2014/0315056 | A1* | 10/2014 | Guen | H01M 2/30 429/61 |
| 2015/0037628 | A1* | 2/2015 | Guen | H01M 2/04 429/61 |
| 2015/0249234 | A1 | 9/2015 | Feigl et al. | |
| 2015/0287977 | A1 | 10/2015 | Lee et al. | |
| 2015/0349319 | A1 | 12/2015 | Kim | |

FOREIGN PATENT DOCUMENTS

| | | |
|---|---|---|
| JP | 2017174554 A | 9/2017 |
| WO | 2014048623 A1 | 4/2014 |
| WO | 2016136249 A1 | 9/2016 |

OTHER PUBLICATIONS

European Search Report from corresponding European Application No. 17001262.9 dated Jan. 31, 2018.
Extended European Search Report from corresponding European Application No. 19000162.8 dated Jul. 30, 2019.

* cited by examiner

TOP COVER ASSEMBLY FOR POWER BATTERY AND POWER BATTERY HAVING THE SAME

CROSS-REFERENCE TO RELATED APPLICATIONS

The present application is a continuation of U.S. application Ser. No. 15/657,625, filed on Jul. 24, 2017, which claims priority to Chinese Patent Application No. 201611095369.0, filed on Dec. 2, 2016, the content of which are incorporated herein by reference in their entireties.

TECHNICAL FIELD

The present application relates to the field of energy storage devices and, particularly, relates to a top cover assembly for power battery.

BACKGROUND

At present, lithium-ion batteries have advantages of high energy density, high power density, longer cycle life and longer storage life. Thus, lithium-ion batteries have been widely applied in portable electronic devices such as mobile phones, digital cameras and portable computers, and also have wild application prospect in electric transportation vehicles such as electric vehicles and electric bicycles, as well as large-and-middle-sized electronic equipment such as energy storage facilities. The lithium-ion battery has become a key point to solve global problems such as energy crisis and environment pollution.

With the increasing improvement of the electric vehicle techniques, electric vehicles and hybrid vehicles become more and more closer to people's life, which brings huge business opportunities and, at the same time, higher demands on the safety performance of the lithium-ion batteries which provide energy for the electric vehicles. Generally, in order to effectively guarantee safety performance of a cell, the cell should have the following functions:

1) the first electrode assembly is electrically connected with the top cover plate;

2) the top cover plate is provided with a safety device, and the deformable plate provided on the top cover plate deforms when the pressure of the internal gas generated in the cell reaches a certain value, so that the first electrode assembly is electrically connected with the second electrode assembly, so as to form an external short circuit of the cell and effectively prevent overcharge of the cell.

However, since components which can realize these functions are arranged, a series of new problems arise in the top cover plate structure for power battery.

Generally, when the deformable plate deforms, the space between the deformable plate and the connecting block will be reduced. If the space is sealed, the air pressure therein will be increased, which influences the pressure value for normal deformation of the deformable plate and increases safety risk of the cell.

On the other hand, during the production of the cell, particularly during liquid injection and formation, it is unavoidable that there are some electrolyte residues around the electrode terminal. Particularly, when the electrolyte residues are excessive, if these electrolyte residues flow into the deformable plate and electrically connect the connecting block with the deformable plate, there will exist the risk of forming an external short circuit during normal use of the cell.

Additionally, the second electrode terminal is usually sealedly insulated from and fixed with the top cover plate by means of an insulating piece for electrode terminal. However, in some situations, the insulating piece for electrode terminal may loosen, age and get injured, leading to loss of sealing performance. Thus, those electrolytes may flow out from the gap between the connecting block and insulating piece and cause adverse consequence.

Moreover, since the top cover plate structure for power battery is small in size and has numerous components, if a corresponding structure is separately disposed in order to solve a specific problem, the structural complexity and assembling difficulties will be significantly increased. Therefore, it is an urgent need to provide a top cover assembly for power battery which can avoid all the abovementioned problems at the same time.

SUMMARY

The present application provides a top cover assembly for power battery and a power battery, which can solve the abovementioned problems.

A first aspect of the present application provides a top cover assembly for power battery, including a first electrode assembly, a second electrode assembly, a top cover plate and a deformable plate, wherein the first electrode assembly is electrically connected with the top cover plate, the deformable plate is attached to the top cover plate, the second electrode assembly comprises a second electrode terminal, a second connecting block, a second insulating piece, an upper sealing piece and a lower sealing piece, a through-hole and a gas-guide hole are defined in the second insulating piece, the second electrode terminal penetrates through the top cover plate and the second insulating piece, and is insulated from the top cover plate, the second connecting block is located over the top cover plate and extends until the second connecting block faces the deformable plate, the second connecting block is electrically connected with the second electrode terminal, the second insulating piece is located between the second connecting block and the top cover plate, the through-hole faces the deformable plate, the upper sealing piece is arranged between the second insulating piece and the second connecting block and comprises a sealing area for deforming space and a sealing area for electrode terminal, both the through-hole and the gas-guide hole are enclosed by the sealing area for deforming space, the second electrode terminal is enclosed by the sealing area for electrode terminal, the lower sealing piece is arranged between the second insulating piece and the top cover plate and encloses the through-hole, the gas-guide hole is located outside the lower sealing piece, and the deformable plate is configured to deform to electrically connect with the second connecting block when an internal pressure of the power battery exceeds a reference pressure.

Preferably, the deformable plate is enclosed by the lower sealing piece.

Preferably, an upper surface of the second insulating piece is provided with a side wall, and the second connecting block is enclosed by the side wall.

Preferably, the upper sealing piece is structured as a rectangular frame, and the sealing area for deforming space is separated from the sealing area for electrode terminal by a common edge thereof.

Preferably, an upper surface of the second insulating piece is provided with an upper clamping slot, and the upper sealing piece is clamped into the upper clamping slot.

Preferably, position limiting areas are provided within the upper clamping slot, position limiting blocks are provided on the upper sealing piece, and the position limiting blocks are clamped into the position limiting areas in one-to-one correspondence.

Preferably, both the sealing area for deforming space and the sealing area for electrode terminal are provided with the positon limiting area.

Preferably, a plurality of position limiting blocks are provided, and at least two of the position limiting blocks are different from each other in orientation, size or shape.

Preferably, a lower surface of the second insulating piece is provided with a lower clamping slot, and the lower sealing piece is clamped into in the lower clamping slot.

Preferably, two gas-guide holes are provided, and the two gas-guide holes are symmetrically arranged.

Preferably, a lower surface of the second insulating piece is provided with a lower gas-guide slot, and the lower gas-guide slot extends from the gas-guide hole to an edge of the second insulating piece along a length direction of the top cover plate.

Preferably, the lower gas-guide slot includes a meandering structure.

Preferably, the lower gas-guide slot includes three corners.

Preferably, an upper surface of the second insulating piece is provided with an upper gas-guide slot, and the upper gas-guide slot extends from the through-hole to the gas-guide hole.

Preferably, the upper gas-guide has a cross section decreasing in a direction from the through-hole to the gas-guide hole.

Preferably, the upper gas-guide slot is structured in a ladder shape which is gradually elevated in a direction from the through-hole to the gas-guide hole.

A second aspect of the present application provides a power battery, including the top cover assembly for power battery.

The technical solutions provided by embodiments of the present application can achieve the following beneficial effects:

The top cover assembly for power battery and the power battery provided by the embodiment of the present application can guarantee gas discharging, avoid the electrolyte from electrically connecting the second connecting block with the top cover plate and prevent the electrolyte from flowing out, and have advantages of compact structure, high integration and convenient assembling.

It is appreciated that the above general description and the following detailed description are merely exemplary, which do not limit the present application.

REFERENCE SIGNS

10—first electrode assembly;
20—second electrode assembly;
200—second electrode terminal;
202—second connecting block;
204—second insulating piece;
204a—through-hole;
204b—gas-guide hole;
204c—upper clamping slot;
204d—lower clamping slot;
204e—position limiting area;
204f—lower gas-guide slot;
204g—side wall;
204h—upper gas-guide slot;
206—upper sealing piece;
206a—sealing area for deforming space;
206b—sealing area for electrode terminal;
206c—position limiting block;
208—lower sealing piece;
209—sealing piece for electrode terminal;
30—deformable plate;
40—top cover plate;
400—connecting hole for deformable plate;
A—deforming space.

The accompanying drawings herein are incorporated into and constitute a part of the description, which show embodiments in conformity with the present application and are used to illustrate the present application together with the description.

DESCRIPTION OF EMBODIMENTS

The present application is described in further details by means of embodiments with reference to the drawings. The expressions "front", "back", "left", "right", "upper" and "lower" herein all refer to the top cover assembly for power battery shown in the figures.

Figure 1:
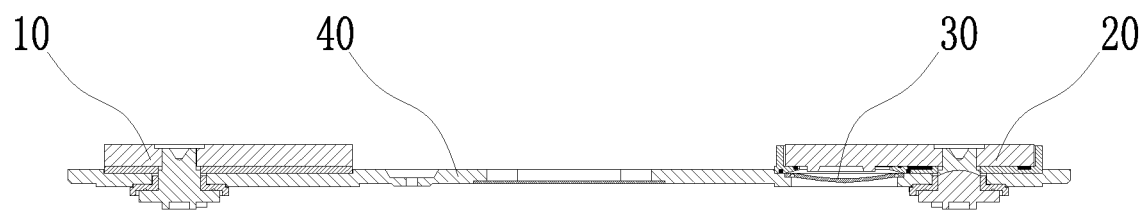
FIG. 1 is a structural diagram of a side cross section of a top cover assembly for power battery according to an embodiment of the present application.

An embodiment of the present application provides a power battery, including a top cover assembly for power battery. As shown in FIG. 1, the top cover assembly for power battery includes a first electrode assembly 10, a second electrode assembly 20, a deformable plate 30 and a top cover plate 40. In practical use, the first electrode assembly 10 may serve as a positive electrode of the power battery, and the second electrode assembly 20 may serve as a negative electrode of the power battery; or, the first electrode assembly 10 may serve as the negative electrode of the power battery, and the second electrode assembly 20 may serve as the positive electrode of the power battery. Detailed description is provided as follows by taking the first electrode assembly 10 as the positive electrode of the power battery and taking the second electrode assembly 20 as the negative electrode of the power battery. In order to prevent the top cover plate 40 from being corroded, the first electrode assembly 10 is electrically connected with the top cover plate 40, so that the top cover plate 40 is positively charged. In the present embodiment, the structure of the first electrode assembly 10 is not limited, as long as it can satisfy the basic demands of a general power battery on the positive electrode assembly.

Figure 2:
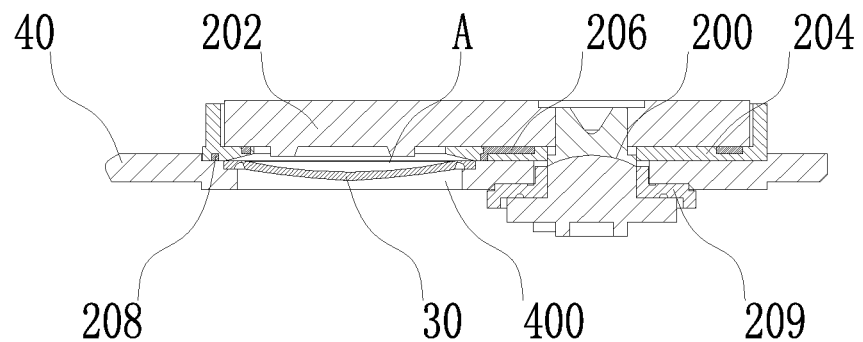
FIG. 2 is a partial enlarged diagram of a top cover assembly for power battery in the vicinity of a second electrode assembly according to an embodiment of the present application.
Figure 3:
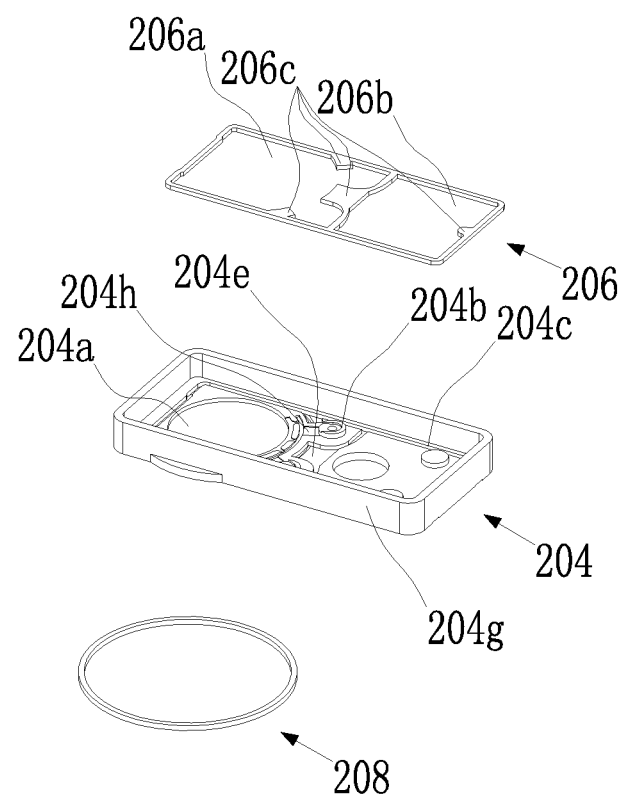
FIG. 3 is an exploded structural diagram of an upper sealing piece, a second insulating piece and a lower sealing piece according to an embodiment of the present application.

As seen in FIG. 2 and FIG. 3, the second electrode assembly 20 includes a second electrode terminal 200, a second connecting block 202, a second insulating piece 204, an upper sealing piece 206 and a lower sealing piece 208. The second electrode terminal 200 penetrates through the top cover plate 40 and the second insulating piece 204, and is connected with the second connecting block 200, as shown in FIG. 2, a connecting hole 400 for deformable plate is provided on a position of the top cover plate 40 at a certain distance from the second electrode terminal 200, the second connecting block 202 is located over the top cover plate 40 and extends all the way until the second connecting block 202 is presented over the connecting hole 400 for deformable plate, and the second connecting block 202 is electrically connected with the second electrode terminal 200.

Figure 4:
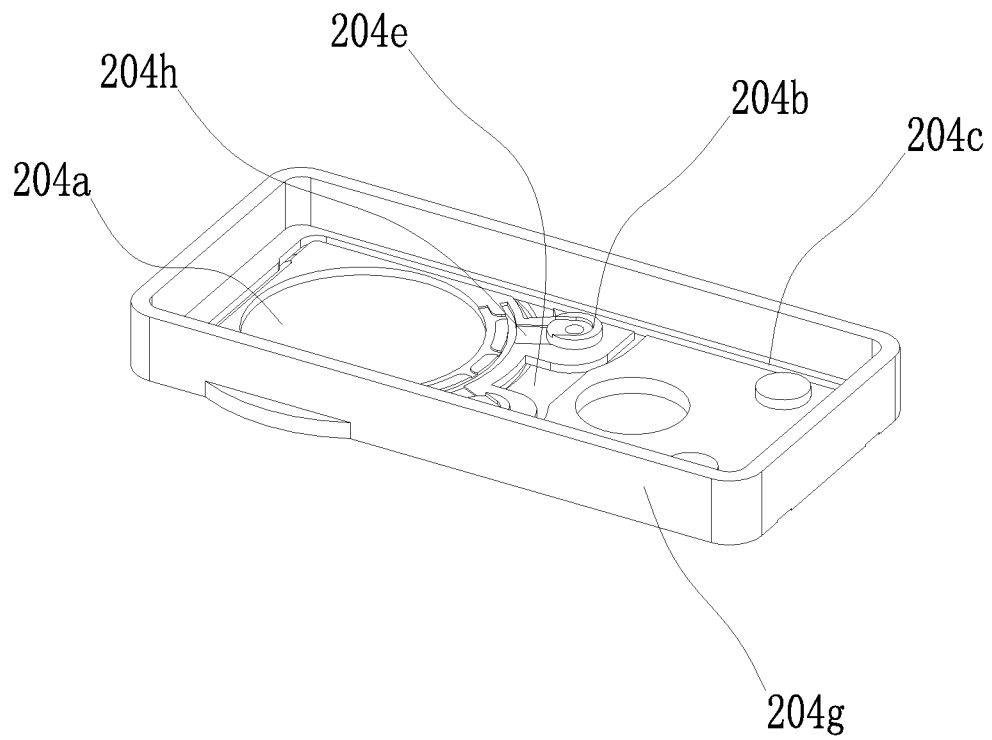
FIG. 4 is a perspective structural diagram of a second sealing piece according to an embodiment of the present application.
Figure 5:
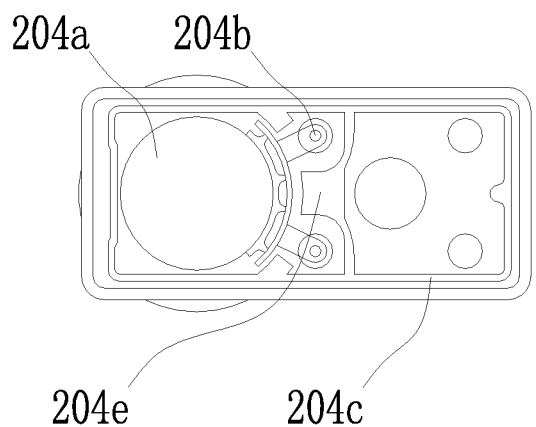
FIG. 5 is a top structural diagram of a second sealing piece according to an embodiment of the present application.
Figure 6:
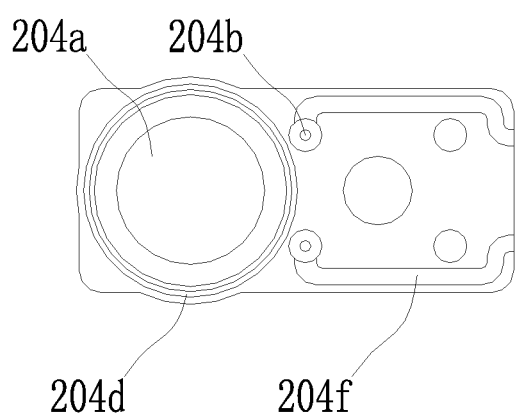
FIG. 6 is a bottom structural diagram of a second sealing piece according to an embodiment of the present application.

The second insulating piece 204 is located between the second connecting block 202 and the top cover plate 40, as shown in FIGS. 3-5, a through-hole 204a for deformable plate and a gas-guide hole 204b are defined in the second insulating piece 204, both the through-hole 204a for deformable plate and the gas-guide hole 204b penetrate through the second insulating piece 204 in a thickness direction of the second insulating piece 204. The through-hole 204a for deformable plate is corresponding to the connecting hole 400 for deformable plate.

As shown in FIG. 2, the upper sealing piece 206 is sealedly arranged between the second insulating piece 204 and the second connecting block 202, and includes a sealing area 206a for deforming space and a sealing area 206b for electrode terminal, both the through-hole 204a for deformable plate and the gas-guide hole 204b are enclosed by the sealing area 206a for deforming space, the lower sealing piece 208 is sealedly arranged between the second insulating piece 204 and the top cover plate 40, and encloses the through-hole 204a for deformable plate. Moreover, the gas-guide hole 204b is located outside the lower sealing piece 208, i.e., the gas-guide hole 204b is not contained in the area enclosed by the lower sealing piece 208. The deformable plate 30 is assembled in the connecting hole 400 for deformable plate and seals the connecting hole 400 for deformable plate. The upper sealing piece 206 and the lower sealing piece 208 may adopt a rubber material (for example, fluororubber), or a cured glue. The upper sealing piece 206 has a thickness of 0.01~30 mm, and preferably 0.5~2 mm; the lower sealing piece 208 has a thickness of 0.01~30 mm, and similarly 0.5~2 mm is preferred.

By means of the sealing area 206a for deforming space and the lower sealing piece 208, the deforming space A, where the upper surface of the deformable plate 30 is located, at a connecting position where the second sealing piece 204 is connected with the second connecting block 202 and a connecting position where the second insulating piece 204 is connected with the top cover plate 40 can be sealed, so that all the other areas of the deforming space A except the gas-guide hole 204 will be in a sealed state. When the deformable plate 30 deforms upward and squeezes gas in the deforming space A, the gas will be discharged out of the deforming space A through the gas-guide hole 204b so as to reduce the pressure in the deforming space A, so that the deformable plate 30 smoothly deforms and contacts with the second connecting block 202 through the through-hole 204a for deformable plate, so as to be electrically connected with the second connecting block 202. The number of the gas-guide hole 204b may be more than one, for example, as shown in FIG. 4 and FIG. 5, two gas-guide holes 204 are symmetrically provided on the second insulating piece 204, so as to disperse and speed up the discharging of the gas.

Further, when there are redundant electrolytes outside the second electrode terminal 200, due to blocking of the sealing area 206a for deforming space, these electrolytes cannot get through the gap between the second connecting block 202 and the second insulating piece 204 into the interior of the deforming space A. At the same time, due to blocking of the lower insulating piece 208, these electrolytes cannot get through the gap between the top cover plate 40 and the second insulating piece 204 into the interior of the deforming space A either. There is still possibility for the electrolyte within the gap between the cover plate 40 and the second insulating piece 204 to enter into the interior of the deforming space A through the gas-guide hole 204b, however, since it is much harder for the electrolyte to permeate through the gas-guide hole 204b than through the gap, moreover, the electrolyte needs to overcome gravity and the blocking from the inner gas pressure of the deforming space A if permeating along the gas-guide hole 204b, therefore, the permeating procedure is very difficult.

Therefore, with such structure, it is guaranteed that the gas in the deforming space A can be smoothly discharged during deformation and, at the same time, the electrolyte is effectively prevented from permeating through the gas-guide hole 204b into the interior of the deforming space A. As long as the electrolyte cannot enter into the interior of the deforming space A, the electrolyte will be insulated by the second insulating piece 204, so that the second connecting block 202 will not be electrically connected with the top cover plate 40.

As shown in FIG. 2, in the present embodiment, the second electrode terminal is sealedly insulated from and fixed with the top cover plate 40 by means of an insulating piece 209 for electrode terminal, once the electrode terminal 209 looses, ages and gets injured and thus loses sealing property, the electrolyte within the power battery will probably pass through the gap between the second electrode terminal 200 and the top cover plate 40 and continuously flow out of the top cover plate 40. Further, the insulating piece 209 for electrode terminal is generally abutted directly against the bottom of the second connecting block 202, therefore, the electrolyte will generally flow out from the gap between the second connecting block 202 and the second insulating piece 204.

In order to avoid the above situation, as shown in FIG. 2, the second electrode terminal 200 is enclosed by the sealing area 206b for electrode terminal. As such, when the insulating piece 209 for electrode terminal fails, the sealing area 206b for electrode terminal can also serve for blocking, so as to prevent the electrolyte from directly flowing out from the gap between the second insulating piece 204 and the second connecting block 202.

As a result, the upper sealing piece 206 can prevent the external electrolyte from entering into the deforming space and prevent the internal electrolyte form flowing out, so as to fully save the internal space within the top cover assembly for power battery. As shown in FIG. 2 and FIG. 3, the upper sealing piece 206 is structured as a rectangular frame, and the sealing area 206a for deforming space is separated from the sealing area 206b for electrode terminal by a common edge thereof.

As shown in FIGS. 3-6, in order to facilitate the fixation of the upper sealing piece 206, the upper surface of the second insulating piece 204 may be provided with an upper clamping slot 204c which corresponds to the upper sealing piece in shape, and the upper sealing piece 206 is clamped and fixed within the upper clamping slot 204c. Similarly, the lower surface of the second insulating piece 204 may be provided with a lower clamping slot 204d, and the lower sealing piece 208 is clamped and fixed within the lower clamping slot 204d.

The upper sealing piece 206 is integrally formed by the sealing area 206a for deforming space and the sealing area 206b for electrode terminal, and thus has large space expansion. Further, the materials of the sealing pieces have relatively high elasticity and readily deform, thus, the sealing pieces cannot be easily fixed. With respect to this, in the present embodiment, position limiting areas 204e are provided within the upper clamping slot 204c, position limiting blocks 206c are provided on the upper sealing piece 206 and the position limiting blocks 206c are clamped within the position limiting areas 204e, so as to better limit the position of the upper sealing piece 206. These position limiting areas 204e and position limiting blocks 206 may vary in orientation, size, shape and position, and there may be limited positions at various angles and various positions when other structural demands of the second insulating piece 204 are satisfied.

Additionally, if there is excessive electrolyte outside the power battery, the excessive electrolyte may electrically connect the top cover plate 40 with the second connecting block 202 directly from the exterior of the power battery. In order to reduce the occurrence probability of such situation, in the present embodiment, the upper surface of the second insulating piece 204 may be provided with a circle of side wall 204g, and the second connecting block 202 is enclosed by the side wall 204g, so that the creepage distance between the top cover plate 40 and the second connecting block 202 is increased, so as to significantly enhance difficulty of electrical connection.

As mentioned above, due to the assembling problem of the top cover assembly for power battery, the second insulating piece 204 is generally connected closely with the top cover plate 40. Thus, there is still possibility that the gas cannot continue flowing and even cannot be discharged out of the gas-guide hole 204b after being discharged into the gap between the second insulating piece 204 and the top cover plate 40 through the gas-guide hole 204b. In order to avoid such problem, as shown in FIG. 5, in the present embodiment, the lower surface of the second insulating piece 204b is further provided with a lower gas-guide slot 204f, and the lower gas-guide slot 204f is extended to the edge of the second insulating piece 204. Thus, the gas in the deforming space A can enter into the lower gas-guide slot 204f through the gas-guide hole 204b and is finally discharged from the edge of the second insulating piece 204. The depth of the lower gas-guide slot 204f is 0.01~2 mm.

The arrangement of the lower gas-guide slot 204f improves the gas discharging ability but virtually makes the passing through of the electrolyte much easier, thus, in order to make it tougher for the electrolyte to pass through, the lower gas-guide slot 204f should be made as long as possible, for example, the lower gas-guide slot 204f is extended along the length direction of the top cover assembly for power battery. Additionally, the lower gas-guide slot 204f may have some meandering structures, for example, bendings, sharp corners, inclined surfaces or curved surfaces at different angels, etc. For example, in the present embodiment, each lower gas-guide slot 204f has three substantially rectangular corners, so as to further increase flowing resistance of the electrolyte within the lower gas-guide slot 204f and comprehensively enhance the passing difficulty for the electrolyte.

In the present embodiment, in order to further increase gas discharging efficiency, the upper surface of the second insulating piece 204 may be provided with an upper gas-guide slot 204h which connects the through-hole 204a for deformable plate with the gas-guide hole 204b. Generally, in order to prevent the electrolyte from entering, the gas-guide hole 204b would not have too large diameter, and the gas-guide hole 204b is arranged along the thickness direction of the second insulating piece 204, therefore, there is high fluid resistance within the gas-guide hole 204b, which may result in that the gas discharging rate at the connecting position where the upper gas-guide slot 204h is connected with the gas-guide hole 204b changes rapidly and thus the gas cannot be smoothly discharged. In order to avoid such problem, the upper gas-guide hole 204h in the present embodiment has a cross section which is gradually decreasing along a direction from the through-hole 204a for deformable plate to the gas-guide hole 204b, so that fluid resistance within the upper gas-guide slot 204h will be increased gradually, so as to reduce the gas discharging rate and avoid rapid changes.

The upper gas-guide slot 204h may be shaped in a uniformly tapered structure or a sectionally tapered structure, for example, a ladder-shaped structure which is gradually elevated (see FIG. 4). The top cover assembly for power battery provided by the present embodiment can guarantee gas discharging, prevent the electrolyte from electrically connecting the second connecting block with the top cover plate by means of connecting channels and, at the same time, prevent the electrolyte from flowing out, and has further advantages of compact structure, high integration and convenient assembling, etc.

The above are merely preferred embodiments of the present application, which are not used to limit the present application, the present application can have various modifications and changes for the person skilled in the art, and all the modifications, equivalent substitutions and improvements made based on the present application shall fall into the protection scope of the present application.

What is claimed is:

1. A top cover assembly for power battery, comprising a second electrode assembly, a top cover plate and a deformable plate, wherein
    the deformable plate is attached to the top cover plate,
    the second electrode assembly comprises a second electrode terminal, a second connecting block, and a second insulating piece, and a through-hole is defined in the second insulating piece,
    the second electrode terminal penetrates through the top cover plate and the second insulating piece,
    the second connecting block is located over the top cover plate and extends until the second connecting block faces the deformable plate, and the second connecting block is electrically connected with the second electrode terminal,
    the second insulating piece is located between the second connecting block and the top cover plate, and the through-hole faces the deformable plate,
    wherein the second electrode assembly further comprises an upper sealing piece, the upper sealing piece is arranged between the second insulating piece and the second connecting block and comprises a sealing area for deforming space and a sealing area for electrode terminal, the through-hole is enclosed by the sealing area for deforming space, and the second electrode terminal is enclosed by the sealing area for electrode terminal.

2. The top cover assembly for power battery according to claim 1, wherein a gas-guide hole is defined in the second insulating piece and the gas-guide hole is enclosed by the sealing area for deforming space, and the second electrode assembly further comprises a lower sealing piece, the lower sealing piece is arranged between the second insulating piece and the top cover plate and encloses the through-hole, and the gas-guide hole is located outside the lower sealing piece.

3. The top cover assembly for power battery according to claim 1, further comprising a first electrode assembly, and the first electrode assembly is electrically connected with the top cover plate, the second electrode terminal is insulated from the top cover plate, and the deformable plate is configured to deform to electrically connect with the second connecting block when an internal pressure of the power battery exceeds a reference pressure.

4. The top cover assembly for power battery according to claim 1, wherein the sealing area for deforming space and the sealing area for electrode terminal are integrated.

5. The top cover assembly for power battery according to claim 1, wherein the sealing area for deforming space is separated from the sealing area for electrode terminal by a common edge thereof.

6. The top cover assembly for power battery according to claim 5, wherein the upper sealing piece is provided with a position limiting block connected to the common edge.

7. The top cover assembly for power battery according to claim 1, wherein the upper sealing piece is structured as a rectangular frame.

8. The top cover assembly for power battery according to claim 1, wherein the upper sealing piece has a thickness of 0.01 mm to 30 mm.

9. The top cover assembly for power battery according to claim 2, wherein the lower sealing piece has a thickness of 0.01 mm to 30 mm.

10. The top cover assembly for power battery according to claim 1, further comprising an insulating piece for electrode terminal sleeved on the second electrode terminal, and the second electrode terminal is insulated from the top cover plate by means of the insulating piece for electrode terminal.

11. The top cover assembly for power battery according to claim 2, wherein the deformable plate is enclosed by the lower sealing piece.

12. The top cover assembly for power battery according to claim 1, wherein an upper surface of the second insulating piece is provided with a side wall, and the second connecting block is enclosed by the side wall.

13. The top cover assembly for power battery according to claim 1, wherein an upper surface of the second insulating piece is provided with an upper clamping slot, and the upper sealing piece is clamped into the upper clamping slot.

14. The top cover assembly for power battery according to claim 13, wherein position limiting areas are provided within the upper clamping slot, position limiting blocks are provided on the upper sealing piece, and the position limiting blocks are clamped into the position limiting areas in one-to-one correspondence.

15. The top cover assembly for power battery according to claim 2, wherein a lower surface of the second insulating piece is provided with a lower clamping slot, and the lower sealing piece is clamped into the lower clamping slot.

16. The top cover assembly for power battery according to claim 1, wherein a lower surface of the second insulating piece is provided with a lower gas-guide slot, and the lower gas-guide slot extends from the gas-guide hole to an edge of the second insulating piece along a length direction of the top cover plate.

17. The top cover assembly for power battery according to claim 16, wherein the lower gas-guide slot comprises a meandering structure.

18. The top cover assembly for power battery according to claim 1, wherein an upper surface of the second insulating piece is provided with an upper gas-guide slot, and the upper gas-guide slot extends from the through-hole to the gas-guide hole.

19. The top cover assembly for power battery according to claim 2, wherein two gas-guide holes are provided, and the two gas-guide holes are symmetrically arranged.

20. A power battery, comprising the top cover assembly for power battery according to claim 1.

* * * * *